United States Patent [19]

Barber

[11] 3,905,828
[45] Sept. 16, 1975

[54] ELECTROLYTIC PROCESSES AND ELECTRODES THEREFOR

[75] Inventor: Anthony Clifford Barber, Sutton Coldfield, England

[73] Assignee: Imperial Metal Industries (Kynoch) Limited, England

[22] Filed: Jan. 24, 1974

[21] Appl. No.: 436,348

[30] Foreign Application Priority Data
Feb. 8, 1973   United Kingdom................ 6187/73
Mar. 26, 1973  United Kingdom.............. 14349/73
Apr. 13, 1973  United Kingdom.............. 17828/73
June 28, 1973  United Kingdom.............. 30757/73

[52] U.S. Cl............... 136/6 R; 136/20; 136/120 R; 29/191.4; 29/473.3
[51] Int. Cl.²......................................... H01M 35/00
[58] Field of Search............ 29/473.3, 473.9, 474.1, 29/474.3, 479, 471.3, 191.4; 136/6 R, 120 R, 20

[56] References Cited
UNITED STATES PATENTS
3,567,407   3/1971   Yoblin.............................. 29/191.4
3,625,662   12/1971  Roberts et al. .................... 29/191.6
3,660,888   5/1972   Epstein et al...................... 29/471.3
3,698,050   10/1972  Rubin............................. 29/473.3 X
3,698,863   10/1972  Roberts et al. ................. 29/191.6 X OTHER PUBLICATIONS
Nucleonics, Udy et al., May, 1953, Vol. 11, pp. 52–59.

Primary Examiner—John H. Mack
Assistant Examiner—C. F. Lefevour
Attorney, Agent, or Firm—Cushman, Darby & Cushman

[57]  ABSTRACT

A method of forming a composite body comprising an elongate body of a film-forming metal such as titanium surrounded by a sheath of a precious metal which comprises the steps of forming an assembly of the two materials, surrounding the same with a sleeve of a solid deformable protection and lubrication material and extruding the assembly to produce the elongate body. The assembly may have a core of high conductivity metal and may be formed into electrodes for use in electrolytic cells such as electro-winning etc.

22 Claims, 6 Drawing Figures

ELECTROLYTIC PROCESSES AND ELECTRODES THEREFOR

BACKGROUND OF THE INVENTION

This invention relates to composite bodies and electrolytic cells incorporating such bodies.

For many years anodes for electrolytic processes have been formed from graphite or lead. However, the graphite is degraded during use and fine pieces continually break off to form a slurry which contaminates the electrolyte and which can interfere with the electrolytic process. The lead tends to dissolve and contaminate the cathode. There has, in the past decade, been a trend towards dimensionally stable anodes which have frequently used a film-forming metal with a precious metal(s)/metal(s) oxide(s) coating. These coatings have usually been applied in a large number of steps which tends to increase the cost of manufacture. There have been suggestions to produce precious metal coated film-forming metal surfaces by electroplating the film-forming metal and subsequently rolling the assembly to close the pores in the precious metal coating which are inevitably formed in the material during the electroplating stage. An example of this type of arrangement will be found in British Pat. Specification No. 1,171,407. It has now been discovered that more extensive working of the composite can produce more effective bonding between the components. However, because of the very thin films of precious metal used and its value, the loss of material on to the working surfaces used in the mechanical working can be detrimental if too much working is given to the composite assembly.

These dimensionally stable anodes can be used in electrowinning to replace the lead anodes or in applied potential cathodic protection systems or in electrolytic cells for the production of chlorine. Technically, these dimensionally stable anodes could be made completely from a precious metal such as platinum. However, the cost of the precious metal is such that it is economically unfeasible. By coating a precious metal on to a film-forming metal, the film-forming metal which would normally form a thick non-conductive layer of oxide when connected as an anode, can be made permanently conducting. If any areas of film-forming metal are left uncovered, they are anodically protected by the formation of a thick oxide film when the anode is in use.

Until the present time, there have been two basic methods of applying a precious metal to the film-forming metal. These have been:

1. Painting and firing several coats of a precious metal containing paint on to the film-forming metal; and
2. Electroplating the precious metal on to the film-forming metal.

As mentioned above, there have been proposals to combine these two methods. Apart from the costs involved in purchasing the precious metal, these manufacturing methods are themselves very costly and this has meant that dimensionally stable anodes, although very superior to non-dimensionally stable anodes, have been relatively expensive heretofore.

By "precious metal" as used herein is meant a metal chosen from the group platinum, iridium, rhodium, palladium, osmium, ruthenium, gold and alloys thereof.

By "film-forming metal" as used herein is meant a metal selected from the group titanium, tantalum, niobium, zirconium or an alloy thereof having comparable anodic properties to the pure metal.

By "protection and lubrication material" as used herein is meant a material which protects its substrate against chemical or physical attack by the surrounding atmosphere and which is itself a lubricant or can be more readily lubricated than its substrate.

SUMMARY OF THE INVENTION

By the present invention there is provided a method of manufacturing a composite body comprising an elongate body of a film-forming metal with a sheath of a precious metal which includes the steps of surrounding a body of a film-forming metal with a sheath of a precious metal, surrounding the body and sheath with a sleeve of solid deformable protection and lubrication material, and extruding the assembly so formed to produce the elongate body.

The elongate body may be further reduced in cross-sectional area by drawing. The protection and lubrication material may be removed after the drawing stage. Alternatively, the protection and lubrication material may be removed after the extrusion stage and if required the elongate body can be further reduced in area, for example by drawing, after the removal of the protection and lubrication material. The extrusion stage may be carried out at an elevated temperature in the range 350° to 1,000°C, preferably 550° to 800°C.

The assembly may be sealed in the sleeve and may be evacuated prior to sealing. The sleeve may be a metal, preferably chosen from the group copper, cupro-nickel, nickel and steel.

The body of the film-forming metal may incorporate a core of a metal of higher electrical conductivity, preferably chosen from the group copper and aluminum.

In those arrangements in which the precious metal is soluble in the protection and lubrication material to a significant extent at the temperatures used for processing, a diffusion barrier of a material, preferably a metal, in which the precious metal is less soluble, may be located between the precious metal and the protection and lubrication material. The diffusion barrier is preferably a continuous layer of a metal. The metal may be iron, steel, nickel or other metal in which the precious metal is less soluble than in the protection and lubrication material.

The precious metal sheath may be in the form of a foil surrounding the body or may be deposited on the body from a liquid or gaseous phase, such as by painting, sputtering, vacuum deposition, electroplating, flame spraying, painting and firing, or electrophoresis. The surface of the precious metal may be oxidised or may have a layer or layers of other material deposited on it.

The present invention further provides an electrolytic cell incorporating an anode having a working surface formed at least in part from an elongate body manufactured by the methods set out above. The electrolytic cell may be a cathodic protection system or an electrowinning system cell, or an electrolysis cell for the electrolysis of brine using an iron or mercury cathode to form hydrogen or sodium at the cathode respectively and chlorine at the anode. Alternatively, the cell may be an electrical battery or accumulator.

BRIEF DESCRIPTION OF THE DRAWINGS

By way of example, embodiments of the present invention will now be described with reference to the accompanying drawings of which.

DESCRIPTION OF THE PREFERRED EMBODIMENTS

Figure 2:
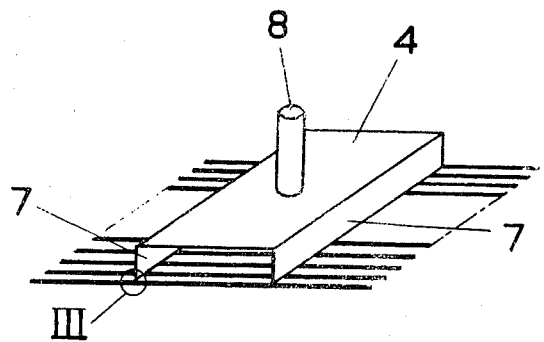
FIG. 2 is a perspective view of one form of anode.
Figure 3:
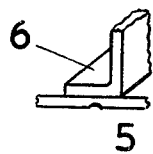
FIG. 3 is an enlarged view of the operation within the circle 3 of FIG. 2.
Figure 4:
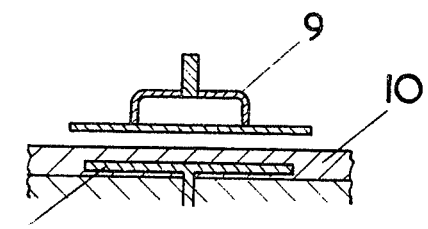
FIG. 4 is a side elevation of a part of an electrolytic cell utilising the anode of FIG. 2.

A composite body comprising titanium with a platinum layer on its surface is manufactured by assembling a cylinder 1 of titanium, surrounding it fully or partially by a platinum sheath 2 and locating the sheathed cylinder in a copper sleeve 3. The copper sleeve is then sealed with copper end plates at both ends and may be evacuated prior to sealing. The assembly is then heated to a temperature of approximately 700°C and is extruded at that temperature to form an extruded section which is typically a thick rod. The thick rod may then be further drawn, swaged or otherwise reduced to form a wire, the copper layer providing ease of lubrication during the extrusion and drawing stages and also acting to protect the platinum layer. The drawn product which is typically of circular cross-section is then pickled in a nitric acid bath to remove the copper layer and produce a platinum-coated titanium wire. The wire may then be further drawn to produce a bright/smooth high surface finish if required. The wire is then cut into lengths and the lengths are straightened and laid side-by-side on a bridge 4 of titanium as shown in FIG. 2. The wires are then spot-welded as at 5 to a flange 6 on the bridge on the legs 7 of the bridge to form the anode illustrated in FIG. 2. A current lead-in 8 is also provided to provide the necessary electrical connection for the anode.

The anode 9 formed as shown in FIG. 2 is located above a stream of mercury 10 in a mercury cell and may be used to electrolyse a solution of brine. The mercury stream 10 is connected to a current lead-in 11 and is connected to be the cathode. During the electrolysis, chlorine is evolved at the anode and the sodium ions dissolved in the mercury for subsequent removal and conversion to sodium hydroxide.

Figure 5:
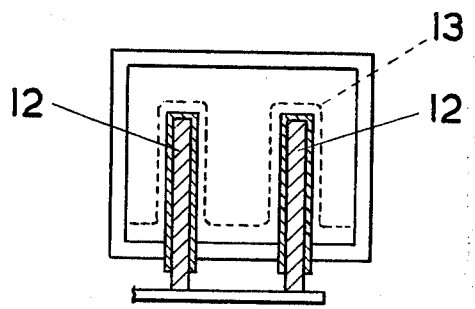
FIG. 5 is an alternative form of cell.

In an alternative electrolytic cell, anodes 12 having a titanium core with a platinum exterior produced by the method described above with the omission of the drawing steps, are used in conjunction with a steel mesh cathode 13. Hydrogen is evolved at the cathode and chlorine is evolved at the anode when the cell of FIG. 5 is used to electrolyse sodium chloride.

Figure 1:
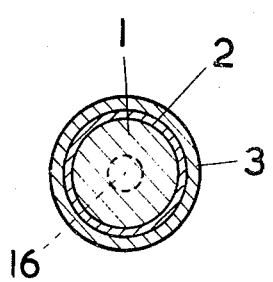
FIG. 1 is a cross-section of a co-extruded elongate body.
Figure 6:
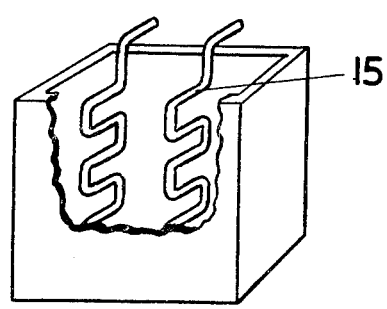
FIG. 6 is a scrap perspective view of a battery.

If gold is used to replace the platinum layer 2 of the assembly illustrated in FIG. 1, than a gold covered titanium rod can be manufactured. This gold covered rod can have deposited on it a lead dioxide layer and will then be suitable for an accumulator anode as shown in FIG. 6 as reference 14. Because the accumulator cathode has to be able to withstand reverse currents during the charging of the accumulator, the cathode 15 may also be manufactured by a similar method but using lead as the coating material rather than lead dioxide. An advantage of the titanium base for the anodes and cathodes in an accumulator is the reduction in weight which can be effected by this method.

If the anode is to be used in an electrowinning cell, any suitable form of rod, wire or tape can be utilised and it will be appreciated that the copper layer used as the protection and lubrication material need not be removed when the anode is manufactured if the anode is to be used in electrowinning of copper. The copper is simply removed during the first stages of the operation of the electrolytic cell during which the copper is anodically dissolved.

If it is necessary to have a high conductivity rod or wire in the anode, then the titanium or other film-forming metal cylinder 1 may have a copper core 16 shown dotted in FIG. 1. Otherwise the processing of such a product is as described above with reference to the simple titanium cylinder.

The extrusion stage may take place at 500°C or at lower temperatures such as 350° to 400°C or even at room temperatures if sufficient press capacity is available, for example if hydrostatic extrusion is used. The titanium material may be replaced by zirconium or niobium or by any other suitable film-forming metal as herein set forth. Additionally, the platinum layer may be replaced by iridium or ruthenium or a platinum-iridium alloy or any other suitable precious metal alloys or precious metal as herein set forth. Of particular importance in this respect are the noble metals, i.e. all those precious metals except gold.

The outer copper sleeve 3 may be replaced by any other suitable protecting material such as nickel or cupro-nickel or mild steel or any other material which is deformable with the other materials of the composite body and which protects the platinum layer. It must not be so soft as to be completely removed during the extrusion and drawing stages, nor must it be so hard as to become embrittled or make the extrusion and drawing stages difficult or impossible. The assembly may be annealed between drawing stages if required.

The composite could be extruded and/or drawn or otherwise reduced to give a variety of cross-sections such as rectangular strip or any other shape.

If required, the precious metal layer, for example the ruthenium layer, can be oxidised after the deformation and pickling stage.

The copper cored platinum coated titanium rod or niobium rod is particularly useful as a cathodic protection anode for use in cathodically protecting structures such as ships, jetties and oil rigs because the structure is easily capable of passing the required electrical currents as a result of the good electrical interconnection between the platinum and the titanium formed by the extrusion of the body of the product at an elevated temperature.

It will be appreciated that the anode may be tubular in form, the electrically conductive material either being on the outside or on the inside of the tube.

The use of a diffusion barrier has economic advantages for all thicknesses of precious metal when copper is used as the protection and lubrication material. This is because the precious metal, e.g. platinum, is dissolved to a certain extent into the copper, and is either wasted or has to be expensively reclaimed from the copper. However, when thin layers, i.e. less than 50 micro-inches are used, the diffusion barriers become of even greater importance. The platinum can dissolve completely into the copper during the extrusion stage at elevated temperatures, and the resulting product can have areas with no platinum, producing a patchwork or filligree effect of bare titanium. This is undesirable for the most part, and it has been found that the use of a diffusion barrier, such as mild steel, between the precious metal and the protection and lubrication material reduces the dissolution of the precious metal by an order of magnitude, i.e. from 3% to 0.4% on 300 microinches thick platinum layers and helps prevent production of uneven and filligree layers of precious metal.

Although the above has referred to platinum as the precious metal and copper as the protection and lubrication material, it will be appreciated that similar problems and solutions may be found for other precious metals and protection and lubrication materials. Thus gold could also be protected by a mild steel diffusion barrier.

Alternatively, if the protection and lubrication material does not dissolve the precious metal to a significant extent, then the diffusion barrier would be unnecessary. Thus using iron or steel as the protection and lubrication material, no diffusion barrier would be necessary.

I claim:

1. A method of manufacturing a composite body comprising an elongate body of a film-forming metal selected from the group consisting of titanium, tantalum, niobium, zirconium and their alloys with a sheath of a precious metal which comprises the steps of surrounding a body of a film-forming metal with a sheath of a precious metal, surrounding the body and sheath with a sleeve of solid deformable protection and lubrication material, sealing the body and sheath into the sleeve, and extruding the assembly so formed to produce the elongate body.

2. A method as claimed in claim 1 in which there is a diffusion barrier of a material, preferably a metal in which the precious metal is less soluble than the protection and lubrication material.

3. A method as claimed in claim 2 in which the diffusion barrier is a continuous layer of a metal.

4. A method as claimed in claim 3 in which the metal is chosen from the group iron, steel or nickel.

5. A method as claimed in claim 1 in which the elongate body is further reduced in cross-sectional area by drawing.

6. A method as claimed in claim 5 in which the protection and lubrication material is removed after the drawing stage.

7. A method as claimed in claim 1 in which the protection and lubrication material is removed after the extrusion stage.

8. A method as claimed in claim 7 in which the elongate body is further reduced in area after removal of the protection and lubrication material.

9. A method as claimed in claim 1 in which the extrusion stage is carried out at an elevated temperature in the range 350°–1000°C, preferably 550°–800°C.

10. A method as claimed in claim 1 in which the assembly is evacuated prior to sealing.

11. A method as claimed in claim 1 in which the sleeve is a metal, preferably chosen from the group copper, cupro-nickel, nickel and steel.

12. A method as claimed in claim 1 in which the body of the film-forming metal incorporates a core of a metal of higher electrical conductivity, preferably chosen from the group copper and aluminum.

13. A method as claimed in claim 1 in which the precious metal sheath is in the form of a foil surrounding the body.

14. A method as claimed in claim 1 in which the precious metal sheath is deposited on the body from a liquid or gaseous phase.

15. A method as claimed in claim 14 in which the deposition method is chosen from the group painting, sputtering, vacuum deposition, electroplating, flame spraying, painting and firing, and electrophoresis.

16. A method as claimed in claim 1 in which the surface of the precious metal is oxidized.

17. An electrolytic cell incorporating an anode having a working surface formed, at least in part, from an elongate body manufactured by the method as claimed in claim 1.

18. An electrolytic cell as claimed in claim 17 in which the cathode is a structure to be protected by a cathodic protection system.

19. An electrolytic cell as claimed in claim 17 in which the cell is an electrowinning cell, in which there is, in use, a metal deposited on the cathode.

20. An electrolytic cell as claimed in claim 17 in which the cell is an electrolysis cell for the electrolysis of brine using an iron or mercury cathode to form hydrogen or sodium at the cathode respectively, and chlorine at the anode.

21. An electrolytic cell as claimed in claim 17 in which the cell is an electrical battery or accumulator.

22. A method as claimed in claim 1 in which the surface of the precious metal has a layer of other material deposited on it.

* * * * *

REEXAMINATION CERTIFICATE (526th)
United States Patent [19]
Barber

[11] B1 3,905,828
[45] Certificate Issued Jul. 15, 1986

[54] ELECTROLYTIC PROCESSES AND ELECTRODES THEREFOR

[75] Inventor: Anthony C. Barber, Sutton Coldfield, England

[73] Assignee: Imperial Metal Industries (Kynoch) Limited, England

Reexamination Request:
No. 90/000,344, Mar. 15, 1983

Reexamination Certificate for:
Patent No.: 3,905,828
Issued: Sep. 16, 1975
Appl. No.: 436,348
Filed: Jan. 24, 1974

[30] Foreign Application Priority Data

Feb. 8, 1973 [GB] United Kingdom ............... 6187/73
Mar. 26, 1973 [GB] United Kingdom ............. 14349/73
Apr. 13, 1973 [GB] United Kingdom ............. 17828/73
Jun. 28, 1973 [GB] United Kingdom ............. 30757/73

[51] Int. Cl.⁴ ............................................. H01M 4/58
[52] U.S. Cl. ................................. 429/218; 29/623.5; 204/105 R; 156/47; 156/666; 228/126; 428/629; 428/651; 428/656; 428/670; 428/675; 428/677; 428/678

[56] References Cited
U.S. PATENT DOCUMENTS

| | | | |
|---|---|---|---|
| 1,465,553 | 8/1920 | Kirk | |
| 2,719,797 | 10/1955 | Rosenblatt et al. | 117/65 |
| 3,187,235 | 6/1965 | Berlincourt et al. | 317/158 |
| 3,313,721 | 4/1967 | Teel | 204/196 |
| 3,514,850 | 6/1970 | Barber et al. | 29/599 |
| 3,567,407 | 3/1971 | Yoblin | 29/191.4 |
| 3,698,050 | 10/1972 | Rubin | 29/25.18 |
| 3,698,863 | 10/1972 | Roberts et al. | 29/183.5 |

FOREIGN PATENT DOCUMENTS

900804 7/1962 United Kingdom .
1051994 12/1966 United Kingdom .
1171407 11/1969 United Kingdom .

OTHER PUBLICATIONS

Inouye, Oak Ridge Nat. Lab. (ORNL)-2065, Jan. 2, 1957, pp. 1-18.
Gardner "*Materials in Design Engineering*", Dec. 1958, pp. 91-93.
Frank, "*Plating*" Dec., 1961, pp. 1305-1309.
"Rare Metals Handbook", Hanpel (1961) p. 317.
Antler, "Plating", Jun. 1970, pp. 615-618.
Sabroff and Frost, "Modern Metals" Jun. 1957, pp. 50-58.
"Metal Deformation Processes" published 1970, Schey, pp. 579-590.

*Primary Examiner*—C. F. Lefevour

[57] ABSTRACT

A method of forming a composite body comprising an elongate body of a film-forming metal such as titanium surrounded by a sheath of a precious metal which comprises the steps of forming an assembly of the two materials, surrounding the same with a sleeve of a solid deformable protection and lubrication material and extruding the assembly to produce the elongate body. The assembly may have a core of high conductivity metal and may be formed into electrodes for use in electrolytic cells such as electro-winning etc.

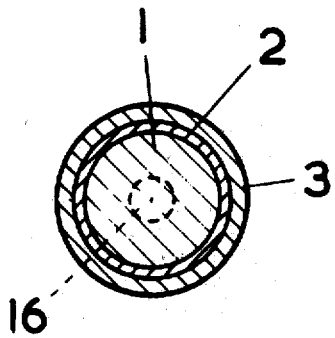

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 64-66:
By "precious metal" as used herein is meant a metal chosen from the group platinum, iridium, rhodium, paladium [, osmium, ruthenium, gold] and alloys thereof.

Column 4, lines 18-29:
The extrusion stage may take place at 500° C. or at lower temperatures such as 350° C. to 400° C. or even at room temperatures if sufficient press capacity is available, for example if hydrostatic extrusion is used. The titanium material may be replaced by zirconium or niobium or by any other suitable film-forming metal as herein set forth. Additionally, the platinum layer may be replaced by iridium [or ruthenium] or a platinum-iridium alloy or any other suitable precious metal alloys or precious metal as herein set forth. Of particular importance in this respect are the noble metals, i.e. all those precious metals except gold.

Column 4, lines 43-45:
If required, the precious metal layer[, for example the ruthenium layer,] can be oxidised after the deformation and pickling stage.

AS A RESULT OF REEXAMINATION, IT HAS BEEN DETERMINED THAT:

Claims 1-22 are cancelled.

New claims 23-48 are added and determined to be patentable.

23. *A method of manufacturing a rod or wire anode for an electrolytic system, the anode comprising a rod or wire of a film-forming metal and a noble metal sheath surrounding the film-forming metal, said method comprising the steps of providing a body of a film-forming metal selected from the group consisting of titanium, tantalum, niobium zirconium and their alloys which have comparable anodic properties to the pure metal with a sheath of a noble metal selected from the group consisting of platinum, iridium, rhodium, palladium and alloys thereof, surrounding the body and sheath with a sleeve of solid deformable protection and lubricating material, sealing the body and sheath into the sleeve, and extruding the assembly so formed to produce said rod or wire anode.*

24. *A method as in claim 23 wherein the sleeve is metal, the method including providing a continuous layer of a metal diffusion barrier between said sheath and said sleeve, the barrier metal being one in which the noble metal is less soluble than the metal of the sleeve.*

25. *A method as in claim 24 wherein the metal diffusion barrier is selected from the group consisting of iron, steel or nickel.*

26. *A method as in claim 25 wherein the sleeve is copper.*

27. *A method as in claim 23 including the step of further reducing the cross-sectional area of the rod or wire anode by drawing.*

28. *A method as in claim 27 including the step of removing the protection and lubrication material after drawing.*

29. *A method as in claim 28 including the step of further reducing the cross-sectional area of the rod or wire anode after removal of the protection and lubricating material.*

30. *A method as in claim 23 including the step of removing the protection and lubricating material after the extrusion stage.*

31. *A method as in claim 30 including the step of further reducing the cross-sectional area of the rod or wire anode after removal of the protection and lubricating material.*

32. *A method as in claim 23 wherein the extrusion stage is carried out at an elevated temperature in the range of 350° to 1000° C.*

33. *A method as in claim 32 wherein the temperature is in the range 550° to 800° C.*

34. *A method as in claim 23 including the step of evacuating the assembly of the body and sheath prior to the sealing step.*

35. *A method as in claim 23 wherein the metal sleeve is selected from the group consisting of copper, cupro-nickel, nickel, and steel.*

36. *A method as in claim 23 wherein the body of the film-forming metal incorporates a core of a metal of higher electrical conductivity than the body.*

37. *A method as in claim 36 wherein the core is selected from the group consisting of copper and aluminum.*

38. *A method as in claim 23 wherein the noble metal sheath is in the form of a foil surrounding the body.*

39. *A method as in claim 23 wherein the noble metal sheath is deposited on the body from a liquid or gaseous phase.*

40. *A method as in claim 39 wherein the deposition is chosen from the group painting, sputtering, vacuum deposition, electroplating, flame spraying, painting and firing, and electrophoresis.*

41. *A method as in claim 23 including the step of oxidizing the noble metal sheath.*

42. *A method as in claim 23 including depositing on the surface of the noble metal a layer of another metal.*

43. *A method of manufacturing a rod or wire anode for an electrolytic system comprising: providing a body of niobium or titanium; surrounding the body with a platinum sheath; placing the body and sheath within a copper sleeve with a continuous diffusion barrier disposed between the sheath and the sleeve, the diffusion barrier being a metal in which the platinum metal is less soluble than in the copper sleeve; evacuating and sealing the sleeve; heating the assembly; extruding the assembly to produce an elongate body; and drawing the elongate body to reduce its cross-section and thereby form said rod or wire electrode.*

44. *A method as claimed in claim 43 in which the body of niobium or titanium has a central core of copper.*

45. *A method as claimed in claim 44 in which the copper sleeve is removed from the drawn elongate body and the elongate body is further drawn.*

46. *A method as claimed in claim 43 in which the copper sleeve is removed from the drawn elongate body and the elongate body is further drawn.*

47. *A rod or wire anode manufactured by the method of claim 43.*

48. *In a cathodic protection system, a cathodic structure to be protected by the system and an anode manufactured by the method of claim 43.*

* * * * *